United States Patent
Izumi (10) Patent No.: US 10,809,773 B2
(45) Date of Patent: Oct. 20, 2020

(54) EXTERNAL DEVICE HAVING PAIRING FUNCTIONALITY WITH OPERATION TERMINAL

(71) Applicant: FANUC CORPORATION, Minamitsuru-gun, Yamanashi (JP)

(72) Inventor: Ryosuke Izumi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/171,752

(22) Filed: Oct. 26, 2018

(65) Prior Publication Data
US 2019/0150211 A1 May 16, 2019

(30) Foreign Application Priority Data
Nov. 10, 2017 (JP) .................. 2017-217745

(51) Int. Cl.
*G06F 1/16* (2006.01)
*G06F 3/02* (2006.01)
*H04W 76/14* (2018.01)

(52) U.S. Cl.
CPC .......... *G06F 1/1698* (2013.01); *G06F 1/1626* (2013.01); *G06F 1/1632* (2013.01); *G06F 1/1669* (2013.01); *G06F 3/0202* (2013.01); *G06F 3/0219* (2013.01); *H04W 76/14* (2018.02)

(58) Field of Classification Search
CPC ................. G06F 1/1613–1698; G06F 3/01
See application file for complete search history.

(56) References Cited

U.S. PATENT DOCUMENTS

| 2009/0051823 | A1 | 2/2009 | Tsurumoto et al. | |
| 2012/0284427 | A1* | 11/2012 | Dods .................. | H04W 88/00 710/3 |
| 2013/0080676 | A1* | 3/2013 | Mifsud ................ | G06F 1/1669 710/304 |
| 2014/0029185 | A1* | 1/2014 | Leong .................. | G06F 1/1626 361/679.08 |

(Continued)

FOREIGN PATENT DOCUMENTS

| CN | 105929894 A | 9/2016 |
| CN | 106534180 A | 3/2017 |

(Continued)

*Primary Examiner* — Gene W Lee
(74) *Attorney, Agent, or Firm* — RatnerPrestia (57) ABSTRACT

An external device includes: an arrangement unit for arranging an operation terminal in which at least a part of a display area of the operation terminal is covered; an arrangement detector for detecting that an operation terminal is arranged on the arrangement unit; an external communicator for transmitting, to the operation terminal, a pairing request signal for wireless communication; and a pairing command input unit provided in an area covering a display area of a touch panel and for receiving input of a command that instructs execution of pairing with the operation terminal, wherein the external communicator is configured to transmit the pairing request signal when the arrangement detector detects that an operation terminal is arranged on the arrangement unit, and pairing with the operation terminal is executed when the command is input and an input operation to a predetermined area of a touch panel is detected.

7 Claims, 7 Drawing Sheets

(56) References Cited

U.S. PATENT DOCUMENTS

| | | | |
|---|---|---|---|
| 2015/0054630 A1* | 2/2015 | Xu | G06F 3/017 340/12.5 |
| 2015/0092329 A1* | 4/2015 | Balasundaram | G06F 1/1692 361/679.09 |
| 2015/0120980 A1* | 4/2015 | Kim | G06F 1/1681 710/303 |
| 2016/0011738 A1* | 1/2016 | Bang | G06F 3/0488 345/173 |
| 2016/0092064 A1* | 3/2016 | Wu | G06F 3/0482 715/789 |
| 2016/0162035 A1* | 6/2016 | Bouwer | G06F 3/04883 715/773 |
| 2016/0252932 A1* | 9/2016 | Seo | G06F 1/1626 345/173 |
| 2016/0297067 A1 | 10/2016 | Kogan et al. | |
| 2017/0034564 A1* | 2/2017 | Jamal-Syed | H04N 21/25866 |

FOREIGN PATENT DOCUMENTS

| | | |
|---|---|---|
| JP | 2008205780 A | 9/2008 |
| JP | 2010052106 A | 3/2010 |
| JP | 2015-232804 A | 12/2015 |
| JP | 2016060016 A | 4/2016 |
| JP | 2016060018 A | 4/2016 |
| WO | 2018179784 A1 | 10/2018 |

\* cited by examiner

EXTERNAL DEVICE HAVING PAIRING FUNCTIONALITY WITH OPERATION TERMINAL

This application is a new U.S. patent application that claims benefit of JP 2017-217745 filed on Nov. 10, 2017, the content of JP 2017-217745 is incorporated herein by reference.

BACKGROUND OF THE INVENTION

1. Field of the Invention

The present invention relates to an external device having a pairing function with an operation terminal.

2. Description of the Related Art

A portable teach pendent connected to a control device of an industrial machine, etc., via wired or wireless communication has been used in order to operate an industrial machine, etc. To date, a portable operation member has been known that includes a holding portion for detachably holding a mobile communication apparatus capable of wireless communication with an industrial machine, a connection section connected to the mobile communication apparatus, and an operation section for creating an operation command for the industrial machine, and that transmits the operation command to the industrial machine via the mobile communication apparatus (for example, Japanese Unexamined Patent Publication (Kokai) No. JP 2015-232804 A).

When wireless communication pairing is performed in a state in which there are multiple portable communication devices capable of wireless communication present in the vicinity, there is a problem that pairing is preferentially performed with the device connected last, and pairing operations with a target device become difficult. In addition, although some systems have a function for switching the connection destination on the device, in environments in which a large number of switch targets are present, a problem arises in that the number of switching channels is insufficient, and it is difficult to select a switching destination. In particular, this problem becomes evident in environments in which frequent connection destination changes are desired.

SUMMARY OF THE INVENTION

In the related art, there is a problem that it is difficult to perform pairing between a specific operation terminal from among a plurality of operation terminals and an external device.

An external device according to one aspect of the present disclosure includes an arrangement unit configured to arrange an operation terminal in which at least a part of a display area of a touch panel of the operation terminal is covered; an arrangement detector configured to detect that an operation terminal is arranged on the arrangement unit; an external communicator configured to transmit, to the operation terminal, a pairing request signal that requests pairing for wireless communication; and a pairing command input unit provided in an area covering a display area of a touch panel and configured to receive input of a command that instructs execution of pairing with the operation terminal, wherein the external communicator is configured to transmit the pairing request signal when the arrangement detector detects that an operation terminal is arranged on the arrangement unit, and pairing with the operation terminal is executed in a case that the command is input to the pairing command input unit and an input operation to a predetermined area of a touch panel provided at a position corresponding to the pairing command input unit is detected.

BRIEF DESCRIPTION OF THE DRAWINGS

The objects, features and advantages of the invention will become more apparent from the following description of the embodiments in connection with the accompanying drawings, wherein.

DETAILED DESCRIPTION

Figure 1:
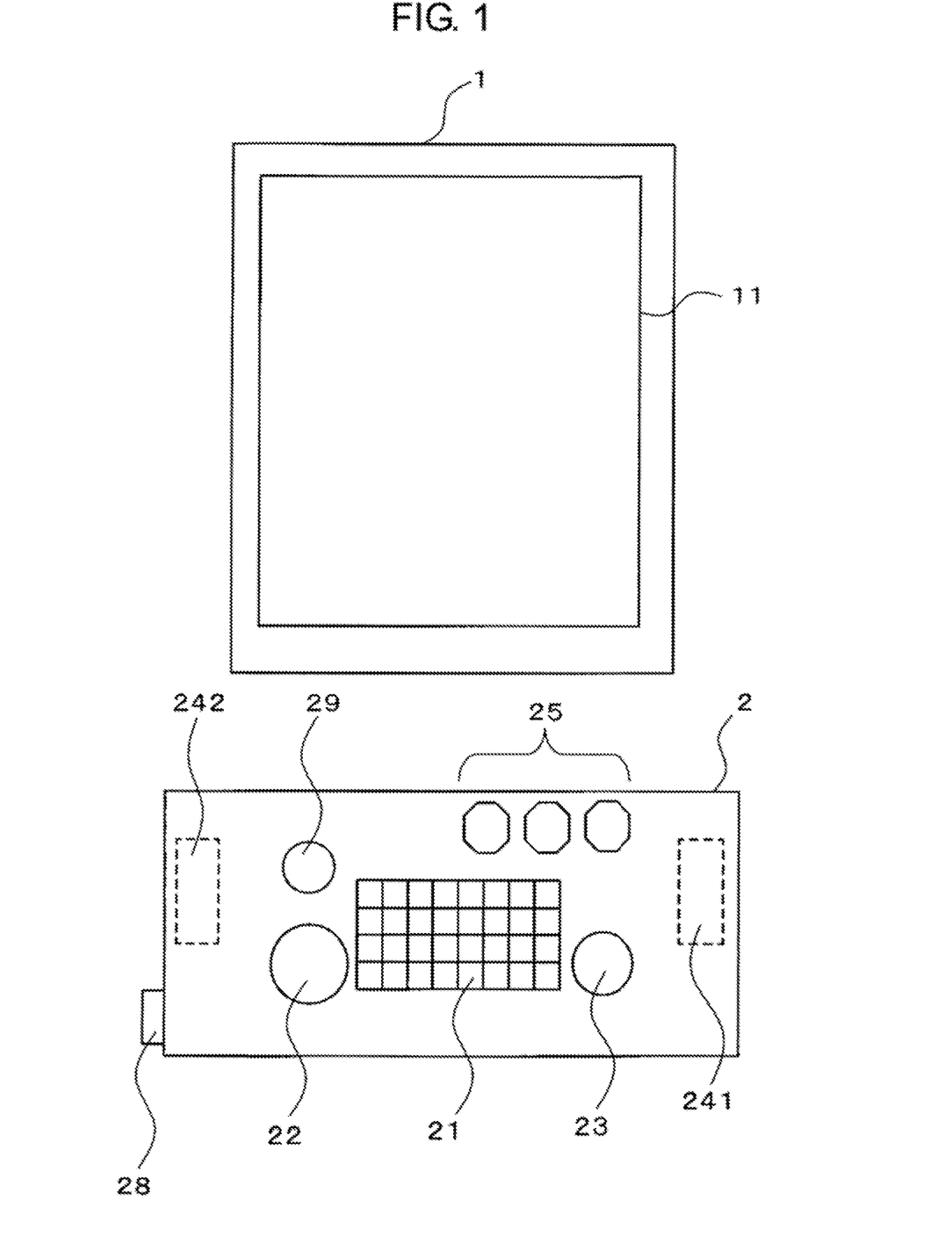
FIG. 1 is a plan view of an external device according to a first embodiment.
Figure 2:
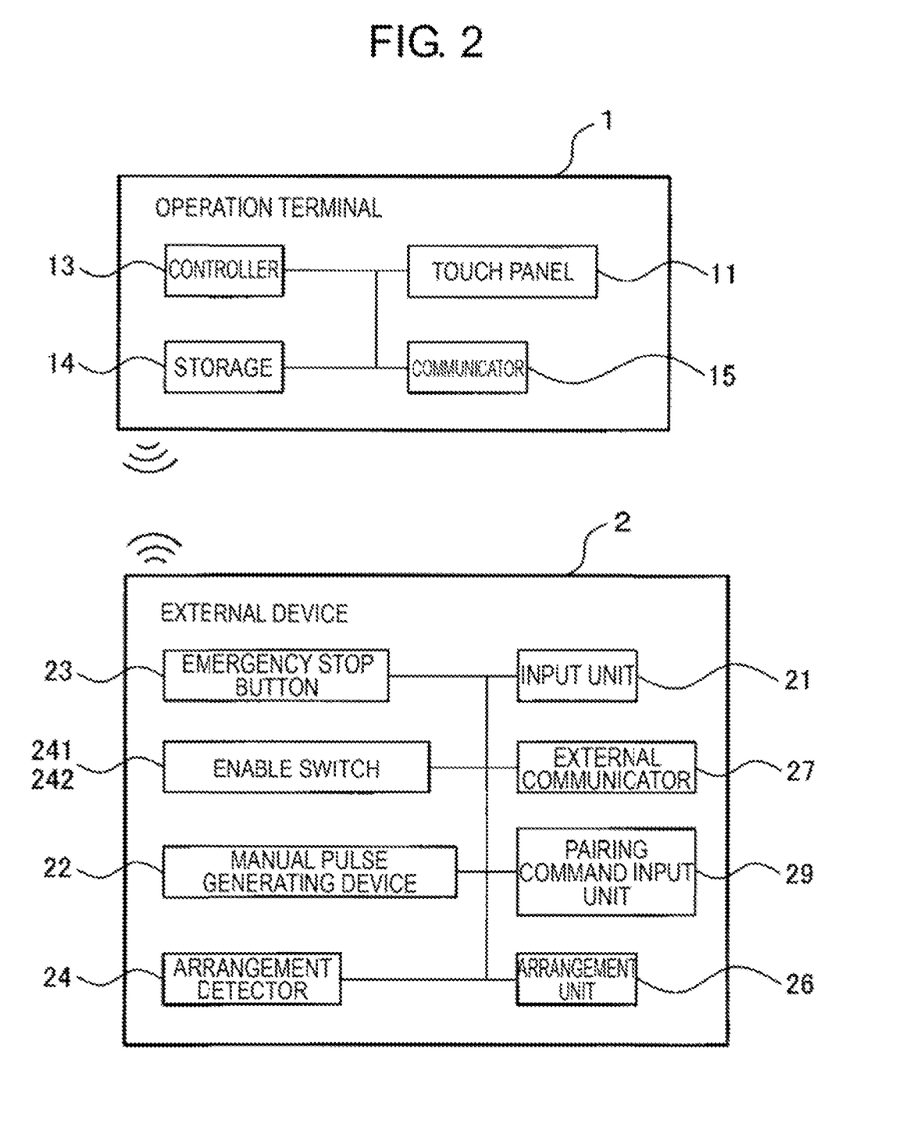
FIG. 2 is a block diagram of the external device according to the first embodiment.
Figure 3:
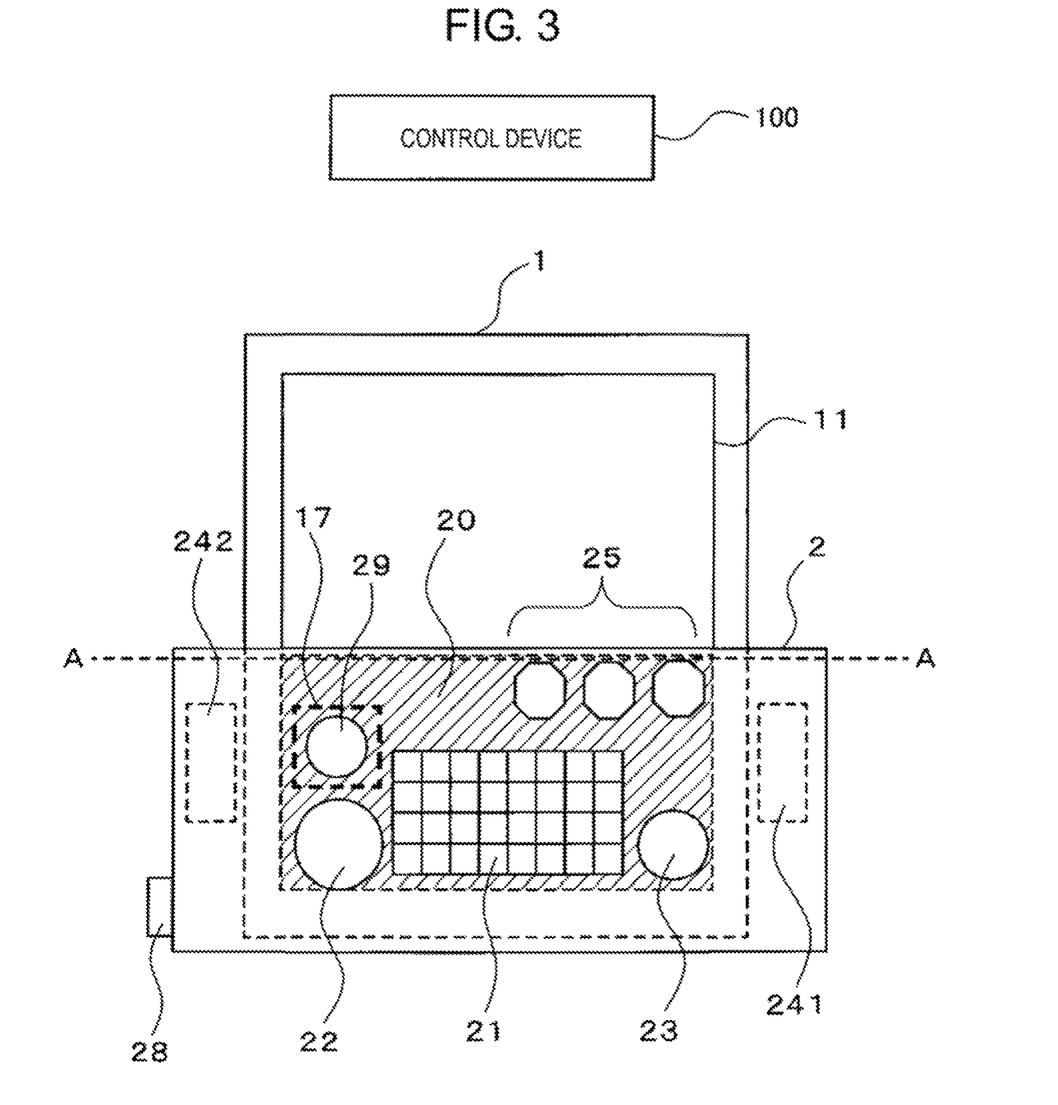
FIG. 3 is a plan view of the external device according to the first embodiment integrated with an operation terminal.

An external device according to a first embodiment will be described. FIG. 1 illustrates a plan view of an external device before being integrated with an operation terminal, and FIG. 2 illustrates a block diagram of the external device according to the first embodiment. In addition, FIG. 3 illustrates a plan view of the external device after integration with the operation terminal. As illustrated in FIG. 3, an external device 2 is connected to a control device 100 of a machine (not illustrated) via a wired or wireless connection, and operates the control device 100. Examples of the machine include a robot, a machine tool, etc., that perform predetermined processing on a workpiece, but are not limited thereto.

The operation terminal 1 includes a touch panel 11 configured to display and receive input of information, and a communicator 15 configured to transmit and receive signals. The operation terminal 1 is preferably portable. For example, a tablet terminal can be used as the operation terminal 1. However, the operation terminal 1 is not limited to this, and a notebook computer including a main body and a display that can be separated from each other can also be used.

The operation terminal 1 further includes a controller 13 and a storage 14. The operation terminal 1 is wirelessly connected to the external device 2 by Bluetooth, Wifi, etc. The external device 2 can communicate with the control device of the machine in a wired or wireless fashion. The operation terminal 1 can communicate with the control device of the machine via the external device 2 or can be in direct wireless communication with the control device of the machine.

The touch panel 11 includes a display device and a position input device disposed on the display device. A size of a display area of the display device is equal to a size of the touch panel 11. The size of the display area of the display device is preferably from about 7 to 15 inches, but may be equal to or less than 7 inches, or equal to or greater than 15 inches. For example, a liquid crystal display device, an organic EL display device, etc., can be used as the display device. An electrostatic capacitance method, a resistance film method, a surface acoustic wave method, etc., can be adopted as a position input method of the position input device. Information can be input to the operation terminal 1 and the operation terminal 1 can be operated by touching the touch panel 11 with a finger or a touch pen.

The display device included in the touch panel 11 can display a screen of application software for operating the machine, textual information, etc. The operator touches the position input device of the touch panel 11 to input positional information, and the input positional information is then transmitted to the controller 13.

The controller 13 includes a central processing unit (CPU), and is connected to the touch panel 11, the storage 14, and the communicator 15. The controller 13 acquires data from the touch panel 11 and the communicator 15, and executes application software, etc., that controls the machine by using information stored in the storage 14. In addition, upon pairing of the operation terminal 1 with the external device 2, the controller 13 can detect completion of the pairing based on a signal from the communicator 15.

A RAM and a ROM built in the operation terminal 1 can be used as the storage 14 capable of storing the application software that controls the machine, information about control of the machine, etc. Moreover, a memory, etc., connected from the outside can also be used as the storage 14.

The communicator 15 communicates with an external communicator 27 of the external device 2. Moreover, the communicator 15 can also communicate with a communicator (not illustrated) of the control device.

The external device 2 includes an arrangement unit 26, an arrangement detector 24, an external communicator 27, and a pairing command input unit 29.

Figure 4:
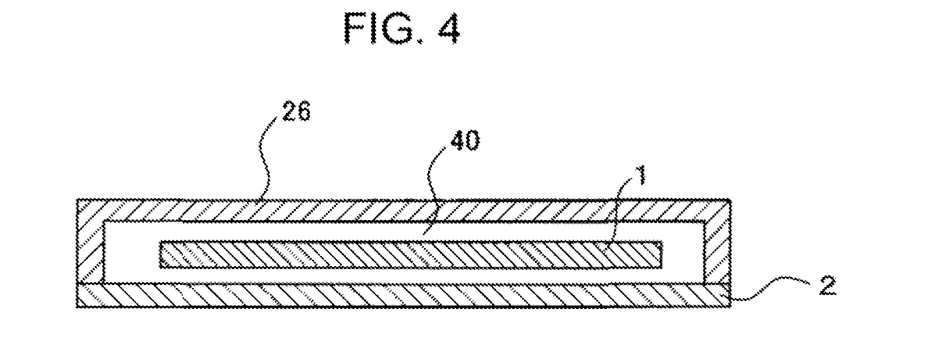
FIG. 4 is a cross-sectional view of the external device according to the first embodiment.

The arrangement unit 26 arranges the operation terminal 1 such that at least a part of the display area of the touch panel 11 of the operation terminal 1 is covered. "Arrangement" of the operation terminal 1 on the external device 2 includes docking the operation terminal 1 to the external device 2. FIG. 4 illustrates a cross-sectional view of the external device according to the first embodiment taken along a line A-A in FIG. 3. The arrangement unit 26 is provided on the rear side of the external device 2. A hollow portion 40 is formed in the arrangement unit 26, and the operation terminal 1 can be arranged in this hollow portion 40.

The arrangement detector 24 detects that the operation terminal 1 is arranged in the arrangement unit 26. A photoelectric sensor may be used for the arrangement detector 24. By detecting the reflected light or the transmitted light of the light emitted from the photoelectric sensor, it is possible to detect whether the operation terminal 1 is physically arranged in the arrangement unit 26.

The external communicator 27 transmits, to the operation terminal 1, a pairing request signal that requests pairing for wireless communication. The external communicator 27 transmits the pairing request signal when the arrangement detector 24 detects that the operation terminal 1 is arranged in the arrangement unit 26. That is, the arrangement of the operation terminal 1 in the arrangement unit 26 serves as a trigger to transmit the pairing request signal. Although the pairing request signal is received by the communicator 15 of the operation terminal 1, this does not mean that the pairing is completed immediately when the communicator 15 receives the pairing request signal. This is because there is a possibility that there are other operation terminals besides the operation terminal 1 that are executing pairing in the vicinity of the external device 2. That is, the operation terminal 1 that has received the pairing request signal from the external communicator 27 of the external device 2 enters a pairing process standby state. At this point in time, the operation terminal 1 does not execute pairing, and the screen display of the touch panel 11 does not change. The operation terminal 1 detects that a pairing request signal for wireless communication is being transmitted from the external device 2. However, the screen display remains unchanged, and the operation terminal 1 waits unitil a pairing process is performed, or alternatively, the pairing request signal comes to an end. At this time, the operation terminal 1 may be set to wait for the pairing process to be performed in the background.

The pairing command input unit 29 is provided in an area 20 that covers the display area of the touch panel 11, and receives input of a command that instructs execution of pairing with the operation terminal 1. As a result of the pairing command input unit 29 being provided in the area 20 that covers the display area of the touch panel 11, operability at the time of pairing execution can be improved.

In a state in which the communicator 15 of the operation terminal 1 is receiving the pairing request signal, a command is input to the pairing command input unit 29, and, in a case that an input operation to a predetermined area 17 of the touch panel 11 is detected, pairing of the operation terminal 1 and the external device 2 is executed. The predetermined area 17 of the touch panel to which the command for executing pairing is input is provided at a position that corresponds to the pairing command input unit 29. For example, it is preferable that the predetermined area 17 of the touch panel be provided directly under the pairing command input unit 29. When performing an input operation to the pairing command input unit 29, it is preferable that the input operation to the predetermined area 17 of the touch panel be performed simultaneously. According to such a configuration, even in a case that a plurality of operation terminals are present in the vicinity of the external device 2, the operation terminal to perform pairing with the external device 2 can be specified.

Figure 5:
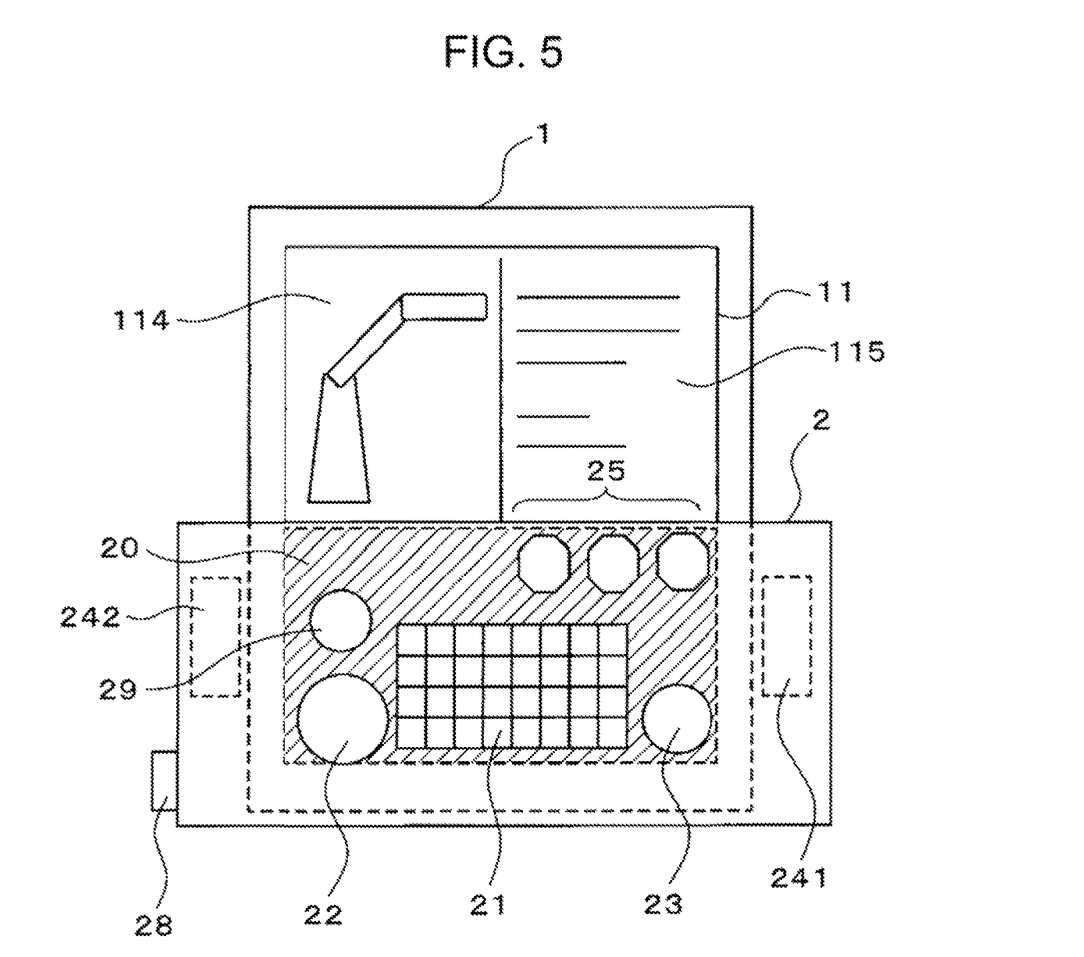
FIG. 5 is a plan view of the external device according to the first embodiment integrated with an operation terminal.

FIG. 5 is a plan view of the external device according to the first embodiment integrated with an operation terminal. As illustrated in FIG. 5, after the pairing is completed, the display screen of the touch panel 11 may be set to automatically switch to a dedicated screen. For example, a first screen 114 that displays the state of a machine such as a robot, or a second screen 115 dedicated to an operation panel such as a parameter input screen, can be displayed in the display area of the touch panel 11.

The pairing command input unit 29 can use a hard key. In this case, a configuration is preferable in which the predetermined area 17 of the touch panel 11 is arranged at a position corresponding to the hard key, and by pressing of the hard key, the input operation is simultaneously detected in the predetermined area 17.

In addition, it is preferable that the pairing command input unit 29 has a function for emitting light while the external communicator 27 is transmitting the pairing request signal. By causing the pairing command input unit 29 to emit light, an operator can easily recognize the position of the pairing command input unit 29.

Furthermore, the predetermined area 17 of the touch panel may have a function for emitting light while the communicator 15 is receiving the pairing request signal. In a case that the external device 2 is made of a transparent or semi-transparent material, by causing the predetermined area 17 to emit light when pairing is executed, an operator can easily recognize the position of the pairing command input unit 29 arranged at the position corresponding to the predetermined area 17. In addition, in the case of lighting-up the operation terminal that serves as the pairing target, it is preferable that operation terminals already paired with other external devices not be allowed to light-up. By doing so, it is possible to avoid pairing with an already-paired operation terminal by mistake.

In addition, unlike the above example, the pairing command input unit 29 may include a touch pad. In this case, in a case that a predetermined touch gesture is executed on the touch pad, it is preferable that a command that instructs execution of pairing with the operation terminal 1 is input. The touch gesture refers to a function on a touch pad for performing an operation by using a specific finger movement. Multiple kinds of gestures, such as taps and drags, can be set as touch gestures. Furthermore, different gestures may be required for each pairing in order to avoid accidental pairing with nearby operation terminals.

In addition, the pairing command input unit 29 may include a gravity sensor. In this case, in a case that a predetermined operation, such as a shaking operation of the external device 2, is executed with respect to the gravity sensor, it is preferable that a command that instructs execution of pairing with the operation terminal 1 is input.

The external device 2 further includes an emergency stop button 23, an enable switch (241, 242), and an input unit 21. The emergency stop button 23 is formed as a physical button on the external device 2. In order to compulsorily stop the machine, the emergency stop button 23 is pressed to transmit an emergency stop instruction to the control device, and the machine then stops.

The enable switch (241, 242) is defined as an enabling device compliant with the ISO 10218-2:2011 (E) (Robots and robotic devices—Safety requirements for industrial robots—Part 2: Robot systems and integration) standard, is used for ensuring the safety of operators, and serves as a switch for performing a machine teaching operation only in a case that the enable switch is active. A representative enable switch (241, 242) has a three-position structure as described in Annex C of ISO 10218-1:2011 (E), and allows safety to be ensured by stopping a machine such as a robot when a operator who senses danger and releases the switch or presses the switch firmly. The enable switch is effective in ensuring safety when the operator works near a movable section such as a robot arm during teaching of the robot.

Data, text, etc., can be input by operating the input unit 21. A keyboard can be provided as the input unit 21. However, the input unit 21 is not limited to this, and a plurality of buttons may be disposed.

The external device 2 may further include a manual pulse generating device 22. The manual pulse generating device 22 can generate a command pulse by manually rotating a handle. The manual pulse generating device 22 may be displayed on the touch panel 11 and generate a command pulse.

The external device 2 may be provided with one or a plurality of switches 25. Examples of the switch 25 include a start button and a stop button of a program. A lamp may be provided instead of the switch. For example, a blue lamp may be caused to light up during normal operation, and a red lamp may be caused to light up during an abnormal condition. Although FIG. 1, FIG. 3, and FIG. 5 illustrate an example in which the external device 2 is provided with three switches as the switches 25, the number of switches may be two or less, or four or more.

The external device 2 is preferably provided with an interface 28 for connecting with the control device 100. A USB connector, etc., can be used as an interface (I/F) 28.

When the operation terminal 1 is paired with the external device 2, data or information input from the input unit 21 is transmitted to the communicator 15 of the operation terminal 1 via the external communicator 27. Information from the emergency stop button 23, the enable switch (241, 242), and the manual pulse generating device 22 is transmitted to the control device of the machine from the external communicator 27 or transmitted to the control device of the machine via the communicator 15 of the operation terminal 1.

As illustrated in FIG. 3, the operation terminal 1 is attached to the external device 2 such that at least a part of the display area of the touch panel 11 is covered. While the operation terminal 1 is attached to the external device 2, the area 20 surrounded by the dotted line in FIG. 3 of the display area of the touch panel 11 is covered by the external device 2.

As a configuration of the external device 2 for holding the operation terminal 1, the external device 2 may have a box-shaped slot. However, the configuration of the external device 2 for holding the operation terminal 1 is not limited to this, and another configuration for fixing the operation terminal 1 may be adopted.

As illustrated in FIG. 3, at least a part of the input unit 21 is provided in the area overlapping the display area. In other words, at least a part of the input unit 21 is provided in the area 20 that is a surface of the external device 2 and covers the display area of the touch panel 11. In this way, by providing at least a part of the input unit 21 in the area 20, size reduction and improved operability of the machine operation panel that integrates the operation terminal 1 and the external device 2 can be achieved. In other words, when the operation terminal 1 is connected to the external device 2 without covering the display area of the operation terminal 1 by the external device 2, the size of the machine operation panel is inevitably larger than the size of the operation terminal 1. Particularly, in a case where the external device 2 is a multifunctional device including various buttons, an input device, etc., the size of the machine operation panel becomes too large, thereby resulting in loss of ease in holding, which is important for an operation panel. In contrast, according to the external device of the first embodiment, the entire size of the machine operation panel can be reduced by integrating the external device 2 so as to cover a part of the operation terminal 1 and by further providing at least a part of the input unit of the external device 2 in the area 20 that covers the display area of the touch panel 11.

After arranging the operation terminal 1 on the external device 2, an active area usable as the display area of the display device of the operation terminal 1 can be designated by an operator touching the touch panel 11. An active display area that can be visually identified by the operator is reduced by covering a part of the display area of the operation terminal 1 by the external device 2, but when the operation terminal 1 is used as the operation panel, no problem arises because even a relatively small screen for operation is sufficient and a large display area (screen) is not needed.

Although FIG. 3 illustrates an example in which the entirety of the input unit 21 is provided in the area 20, it is also possible to provide only a part of the input unit 21 in the area 20. Furthermore, at least one of the manual pulse generating device 22, the emergency stop button 23, or the switches 25 may be disposed so as to overlap the area 20. In this way, the size of the external device can be further reduced.

As described above, according to the external device of the first embodiment, even in a case that a plurality of operation terminals are present in the vicinity of an external device, pairing with an operation terminal arranged on the external device can be easily performed.

Figure 6:
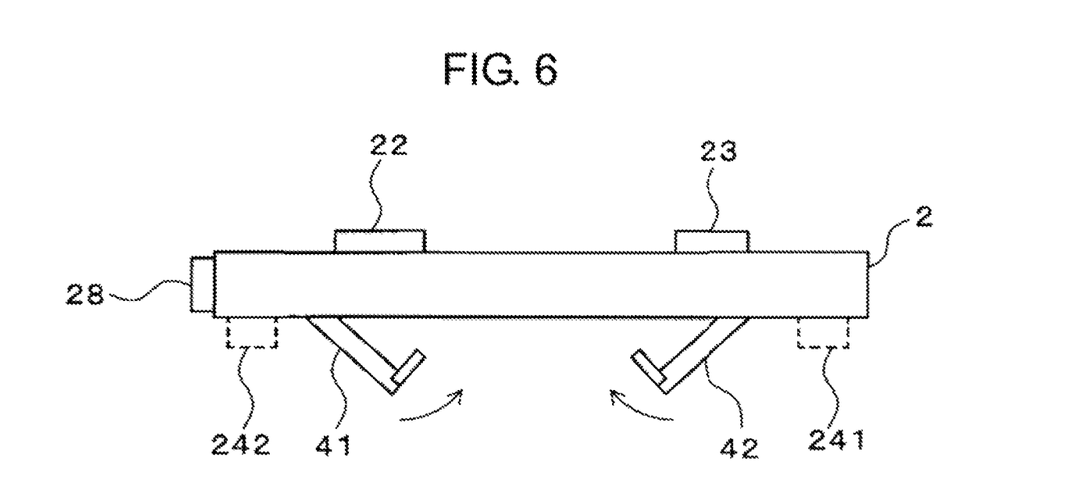
FIG. 6 is a side view of an external device according to a second embodiment.

Next, an external device according to a second embodiment will be described. FIG. 6 illustrates a side view of an external device according to the second embodiment, where the external device is provided with a latch for fixing an operation terminal. The points in which the external device according to the second embodiment differs from the external device according to the first embodiment are that the arrangement unit 26 has a latch structure (41, 42) for fixing the operation terminal 1, and, when the operation terminal 1 is fixed by the latch structure (41, 42), the arrangement detector 24 detects that the operation terminal 1 is arranged. Since the other configurations of the external device according to the second embodiment are similar to those of the external device according to the first embodiment, a detailed description thereof is omitted.

In the external device according to the first embodiment, it is detected that the operation terminal 1 is arranged on the external device 2, and a pairing request signal is transmitted. In contrast, in the external device according to the second embodiment, it is detected that the operation terminal 1 is fixed (latched) to the external device 2, and a pairing request signal is transmitted. In response to receiving the pairing request signal, the operation terminal 1 enters a pairing standby state. Conversely, when the latch is released to remove the operation terminal 1 from the external device 2, the pairing standby state is canceled.

Accidental release of the latch structure (41, 42) by an erroneous operation after the operation terminal 1 is latched to the external device 2 is also considered. Accordingly, in a case that an operation for releasing the latch structure (41, 42) is performed after the operation terminal 1 is latched by the external device 2, a warning may be issued from the operation terminal 1 or the external device 2, or a message, etc., for verifying whether the pairing standby state may be canceled may be displayed on the operation terminal 1. According to such a configuration, even in a case when an operation to release the latch structure (41, 42) is performed by an erroneous operation, the pairing standby state can be maintained.

Figure 7:
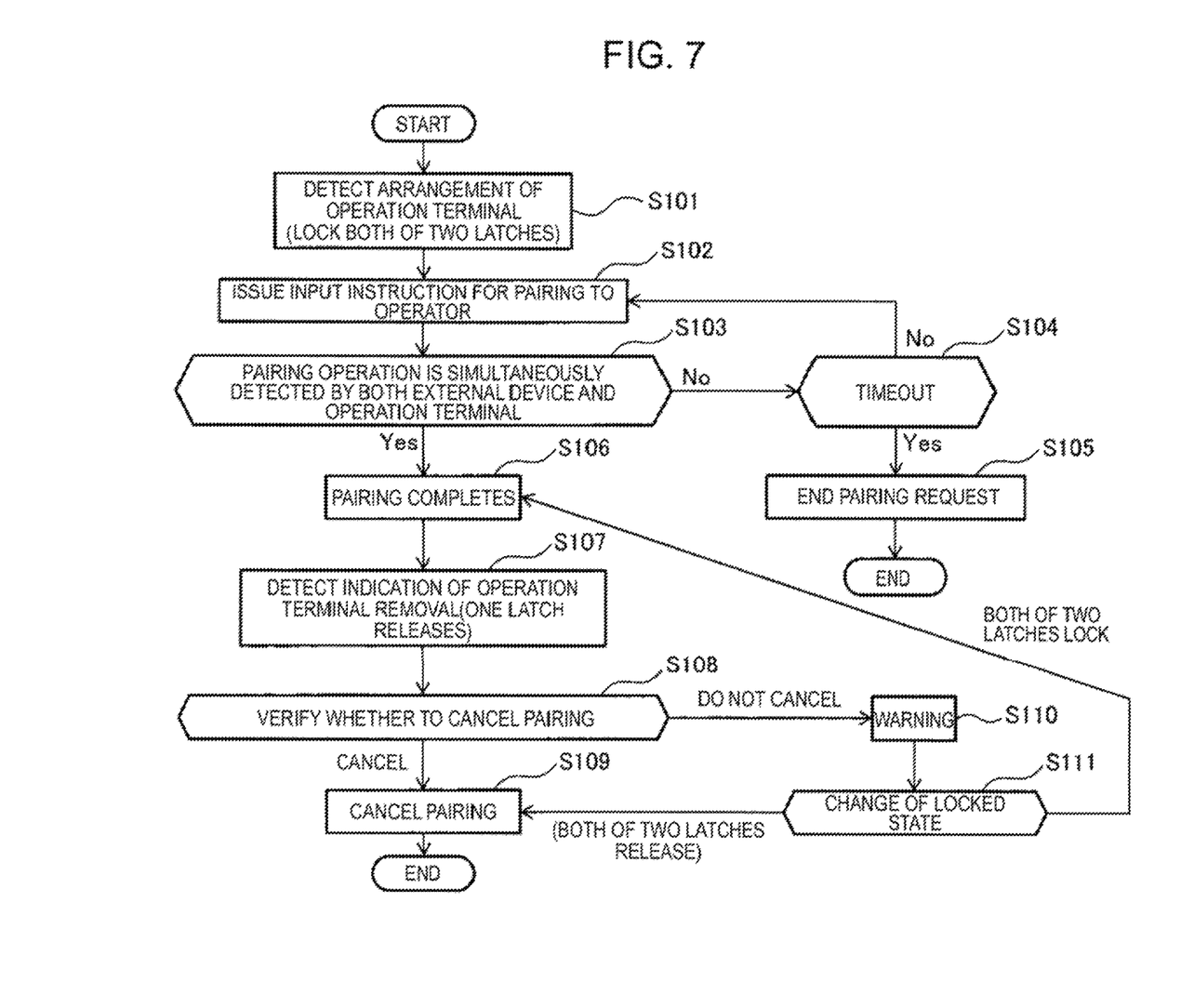
FIG. 7 is a flowchart for explaining the operation procedure of the external device according to the second embodiment.

Next, an operation procedure of the external device according to the second embodiment will be described with reference to the flowchart illustrated in FIG. 7. In Step S101, arrangement of the operation terminal 1 on the external device 2 is detected. That is, it is detected that the operation terminal 1 is fixed (locked) to the external device 2 by the latch structure (41, 42). At this time, the arrangement detector 24 detects that the operation terminal 1 is latched by the latch structure (41, 42), and the external communicator 27 of the external device 2 transmits a pairing request signal to the communicator 15 of the operation terminal 1.

Next, in Step S102, an input instruction for pairing is issued to an operator. For example, a command is input to the pairing command input unit 29, and a display requesting performance of an input operation in a predetermined area 17 of the touch panel 11 is displayed on at least one of the operation terminal 1 or the external device 2.

Next, in Step S103, it is determined whether both the external device 2 and the operation terminal 1 have detected the pairing operation simultaneously. That is, it is determined whether a command was input to the pairing command input unit 29 and an input operation to the predetermined area 17 of the touch panel 11 was performed.

In the case that there was no pairing operation, in Step S104, a predetermined time is waited. In the case that there is no pairing operation even after elapse of the predetermined time, a timeout is determined, and the pairing request is terminated in Step S105. In particular, the external communicator 27 ceases transmission of the pairing request signal.

In contrast, if the predetermined time has not elapsed, it is determined in Step S104 that a timeout has not occurred, and Step S102 is returned to and the pairing operation is continued.

However, in the case that the pairing operation was performed in Step S103, then the pairing is completed in Step S106.

Next, it is assumed that an indication of removal of the operation terminal is detected in Step S107. For example, it is assumed that one of the two latch structures (41, 42) is released.

At this time, in Step S108, it is verified whether pairing is to be canceled. In the case that pairing is to be canceled, then the pairing is canceled in Step S109.

In contrast, in the case that pairing is not to be canceled, a warning is issued in Step S110. For example, a warning may be issued from the operation terminal 1 or the external device 2 by sound, light, etc., or a message prompting locking of the two latch structures may be displayed on the operation terminal 1.

Next, in Step S111, it is determined whether the lock state of the latch structure (41, 42) has changed. In the case that both of the two latches are released, then pairing is canceled in Step S109.

In contrast, in the case that both of the two latches are locked, a state in which pairing is completed is maintained in S106.

Although an example in which two latch structures are provided was described in the above description, one latch structure, or three or more latch structures may also be used. In the case of one latch structure, it may be verified whether to maintain pairing when the latch structure is brought into a nearly released state.

As described above, according to the external device of the second embodiment, since the arrangement detector is configured to detect that the operation terminal is arranged when the operation terminal is fixed by the latch structure, it can easily be determined that the operation terminal is arranged on the external device.

Figure 8:
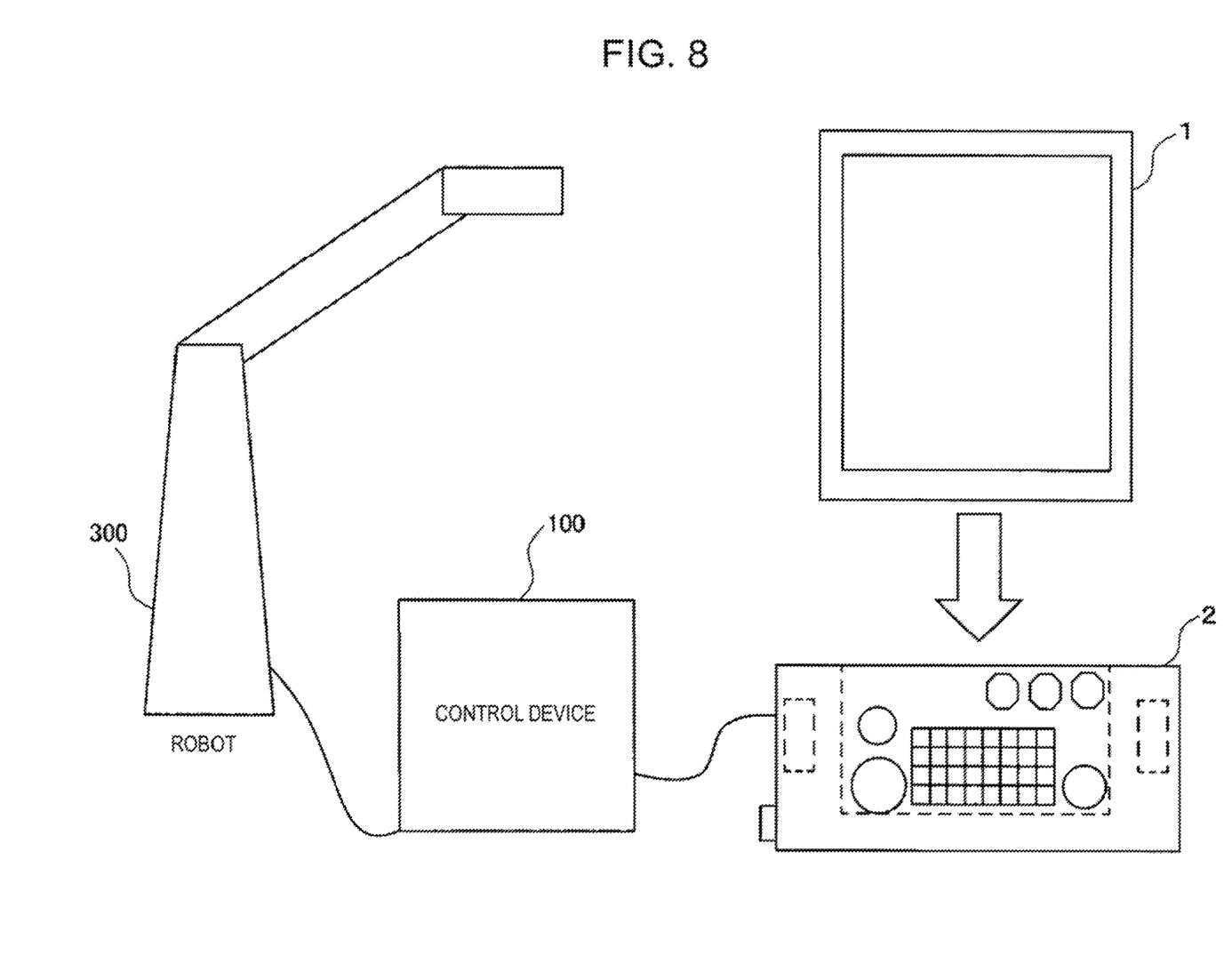
FIG. 8 is a plan view of a system including an external device, an operation terminal, and a machine according to a third embodiment.

Next, an external device according to a third embodiment will be described. FIG. 8 illustrates a plan view of an external device according to the third embodiment, and illustrates an entire configuration including a robot that pairs with an operation terminal. The point in which the external device according to the third embodiment differs from the external device according to the first embodiment is that, when the external device 2 is paired with the operation terminal 1, the operation terminal 1 also performs pairing with a machine. Since the other configuration of the external device according to the third embodiment is similar to that of the external device according to the first embodiment, a detailed description thereof is omitted.

As illustrated in FIG. 8, in the case that the control device 100 controls the robot 300, when the external device 2 is paired with the operation terminal 1, the operation terminal 1 also performs pairing with the robot 300. However, such examples are not limiting, and the operation terminal 1 may be paired with a machine other than a robot controlled by the control device 100.

In a case that the external device 2 can operate the device (for example, the robot 300) alone, the pairing of the operation terminal 1 and the robot 300 may also be performed automatically in conjunction with the pairing of the operation terminal 1 and the external device 2.

In this way, according to the external device of the third embodiment, when the external device 2 is paired with the operation terminal 1, as there is no need for the operation terminal 1 to perform an operation for executing pairing with the machine, it is possible to easily achieve pairing between the operation terminal 1 and the machine.

In the above description of the embodiments, although an example was described in which an external device was connected to a control device of a machine, such examples are not limiting. For example, the external device may optionally include a game execution function, a communication function, a call function, a picture capturing function, a video imaging function, a music playback function, a projection function, a printing function, etc.

According to the external device of an embodiment of the present disclosure, in an external device of a type in which a part of the display area (screen) of the operation terminal is covered, by making use of the part covering the screen, pairing of a target operation terminal with a specific operation terminal can be easily performed.

What is claimed is:

1. An external device comprising:
   an arranger configured to arrange an operation terminal relative to the external device, wherein at least a part of a display area of a touch panel of the operation terminal is covered by the external device;
   an arrangement detector configured to detect that an operation terminal is arranged on the arranger;
   an external communicator configured to transmit, to the operation terminal, a pairing request signal that requests pairing for wireless communication; and
   a pairing command input unit provided in an area covering a display area of a touch panel and configured to receive input of a command that instructs execution of pairing with the operation terminal and a machine, wherein
   the external communicator is triggered to transmit the pairing request signal when the arrangement detector detects that the operation terminal is arranged on the arranger, and
   pairing with the operation terminal is executed when the command to execute pairing is input to the pairing command input unit and an input operation is detected at a predetermined area of a touch panel provided at a position corresponding to the pairing command input unit.

2. The external device according to claim 1, wherein:
   the pairing command input unit is a hard key,
   the predetermined area is arranged at a position corresponding to the hard key, and
   the input operation is simultaneously detected in the predetermined area by pressing the hard key.

3. The external device according to claim 1, wherein:
   the pairing command input unit includes a function of emitting light when the external communicator transmits the pairing request signal.

4. The external device according to claim 1, wherein:
   the pairing command input unit includes a touch pad, and
   a command that instructs execution of pairing with the operation terminal is input when a predetermined gesture is executed with respect to the touch pad.

5. The external device according to claim 1, wherein:
   the pairing command input unit includes a gravity sensor, and
   a command that instructs execution of pairing with the operation terminal is input when a predetermined operation is executed with respect to the gravity sensor.

6. The external device according to claim 1, wherein:
   the arranger includes a latch structure configured to fix the operation terminal to the external device, and
   the arrangement detector is configured to detect when the operation terminal is fixed by the latch structure.

7. A system comprising:
   the external device according to claim 1;
   an operation terminal; and
   a machine, wherein
   the operation terminal executes pairing with the machine when the external device is paired with the operation terminal.

* * * * *